(12) United States Patent
Wedemeyer

(10) Patent No.: US 6,381,859 B1
(45) Date of Patent: May 7, 2002

(54) WATER LEVEL

(75) Inventor: Peter von Wedemeyer, Annweiler am Trifels (DE)

(73) Assignee: Stabila-Messgerate Gustav Ullrich GmbH & Co. KG, Annweiler am Trifels (DE)

( * ) Notice: Subject to any disclaimer, the term of this patent is extended or adjusted under 35 U.S.C. 154(b) by 0 days.

(21) Appl. No.: 09/193,039

(22) Filed: Nov. 16, 1998

(30) Foreign Application Priority Data

Aug. 14, 1998 (DE) .................................... 298 14 656 U

(51) Int. Cl.⁷ ................................................ G01C 9/00
(52) U.S. Cl. ............................................ 33/365; 33/451
(58) Field of Search .......................... 33/365, 377, 379, 33/451, 518; 242/379, 376

(56) References Cited

U.S. PATENT DOCUMENTS

| | | | | |
|---|---|---|---|---|
| 54,626 A | * | 5/1866 | Vandergrift | 33/377 |
| 523,894 A | * | 7/1894 | Hughes | 33/365 |
| 1,308,765 A | * | 7/1919 | Powell | 33/365 |
| 2,354,756 A | * | 8/1944 | Keuffel et al. | 33/755 |
| 2,669,029 A | * | 2/1954 | Ries | 33/377 |
| 3,561,123 A | * | 2/1971 | Bowman | 33/365 |
| 4,527,334 A | * | 7/1985 | Jones et al. | 33/761 |
| 4,571,845 A | * | 2/1986 | Wright et al. | 33/379 |
| 4,860,459 A | * | 8/1989 | Dengler | 33/379 |
| 5,398,422 A | * | 3/1995 | Clarkson | 33/365 |
| 5,479,717 A | | 1/1996 | Von Wedemeyer | |
| 5,588,217 A | * | 12/1996 | Lindner et al. | 33/379 |
| 5,709,034 A | * | 1/1998 | Kohner | 33/377 |
| 6,182,916 B1 | * | 2/2001 | Lin | 242/381.2 |

FOREIGN PATENT DOCUMENTS

| | | | | |
|---|---|---|---|---|
| AT | 2278919 | * | 12/1994 | 33/365 |
| DE | 7212246 | | 3/1972 | |
| DE | 7704713 | | 2/1977 | |
| EP | 0178257 | | 4/1986 | |

\* cited by examiner

Primary Examiner—Christopher W. Fulton
(74) Attorney, Agent, or Firm—Friedrich Kueffner

(57) ABSTRACT

A water level includes a hollow metal section having at least one bottom measuring surface and side walls, and at least one position sensor, preferably a bubble level. Usually two bubble levels are provided. The metal section is closed by end caps. A protective cap of an elastic, impact-proof material is placed on the upper side of the metal section and the protective cap is placed on the metal section in such a way that an impact energy introduced at a single point-like location is distributed over a larger surface of the metal section.

12 Claims, 2 Drawing Sheets

WATER LEVEL

BACKGROUND OF THE INVENTION

1. Field of the Invention

The present invention relates to a water level including a hollow metal section having at least one bottom measuring surface and side walls, and at least one position sensor, preferably a bubble level. Usually two bubble levels are provided. The metal section is closed by end caps.

2. Description of the Related Art

Millions of water levels of the above-described type are in use today in the world. They are used for aligning objects precisely in the horizontal and vertical directions. They are usually composed of an elongated base body having a rectangular cross-section and are made of wood, metal or also synthetic material.

Water levels with a base body of synthetic material are disclosed, for example, in DE-U 72 12 246 or DE-U 77 04 713. However, these water levels did not find acceptance.

The water levels used most are those whose base body is of a hollow section having a rectangular cross-section. The material of the base body predominately is light metal because this material can be shaped by the extrusion molding method and has a light weight and is corrosion-resistant. However, water levels produced from a hollow section are sensitive to impact. The water levels are indented and these indentations make the water level useless.

In many cases, the work piece to be aligned can only be brought into the correct position by means of a tool, for example, a hammer. If the water level is not to be damaged, it must always be removed from the workpiece and then subsequently must be placed on the workpiece once again. This is cumbersome and time-consuming.

In many fields of application it is necessary that the water level remains always placed against the workpiece even when the alignment is carried out by means of a hammer, so that a precise and fast result of the operation can be achieved. Typical examples are tile layers and brick layers. In these fields, impact-sensitive materials are being used increasingly today, for example, porous clay bricks, autoclaved aerated concrete blocks, tiles and plates. These materials are not placed in mortar, but are placed in thin beds of adhesive and are tapped with soft rubber hammers. This always makes it necessary to change the tool, which, in turn, makes the operation cumbersome. In that situation, it is better to press the brick or block into the adhesive bed by lightly tapping on the water level. The upper side of the water level is the only useful surface where tapping with a hammer can be performed. Since conventional hollow sections of light metal would be damaged by impacts from a hammer, in these fields of applications water levels are still used today with a base body of wood, although wood, as is well known, is less suitable for the manufacture of water levels.

SUMMARY OF THE INVENTION

Therefore, it is the primary object of the present invention to provide a water level in which the disadvantages described above are eliminated, and to further develop conventional water levels in such a way that impacts with a tool do not lead to damage.

In accordance with the present invention, a protective cap of an elastic, impact-proof material is placed on the upper side of the metal section and the protective cap is placed on the metal section in such a way that an impact energy introduced at a single point-like location is distributed over a larger surface of the metal section.

The protective cap according to the present invention distributes the concentrated impact energy produced by tools such as hammers, axes, mason's trowels, etc., over a wide surface area on the upper side of the metal section, so that the level is no longer damaged, indented, etc. Nevertheless, sufficient energy is still transmitted to the workpiece to be aligned. The water level no longer has to be removed from the workpiece, so that it is immediately apparent whether the work piece has reached the desired horizontal or vertical position.

In accordance with an advantageous further development of the invention, the protective cap is constructed in such a way that the impact energy is preferably introduced into the side walls of the metal section. This is of particular advantage if the metal section is of light metal.

In accordance with an advantageous feature, the protective cap is removably placed on the metal section. Consequently, the protective cap can be manufactured in a separate work step, can be cut to length and then slid onto the metal section of the water level. This also makes it possible to replace the protective cap when necessary.

For improving the support of the protective cap on the metal section, the metal section preferably has at least one key and the protective cap a corresponding groove or vice versa.

Suitable materials for manufacturing the protective cap are all impact-proof and still elastic materials. The preferred material is rubber, however, synthetic materials or wood can also be used.

In accordance with a preferred further development of the invention, the protective cap is of a composite material, wherein the inner layers are relatively soft and the outer layers are relatively hard.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

DESCRIPTION OF THE PREFERRED EMBODIMENTS

Figure 1:
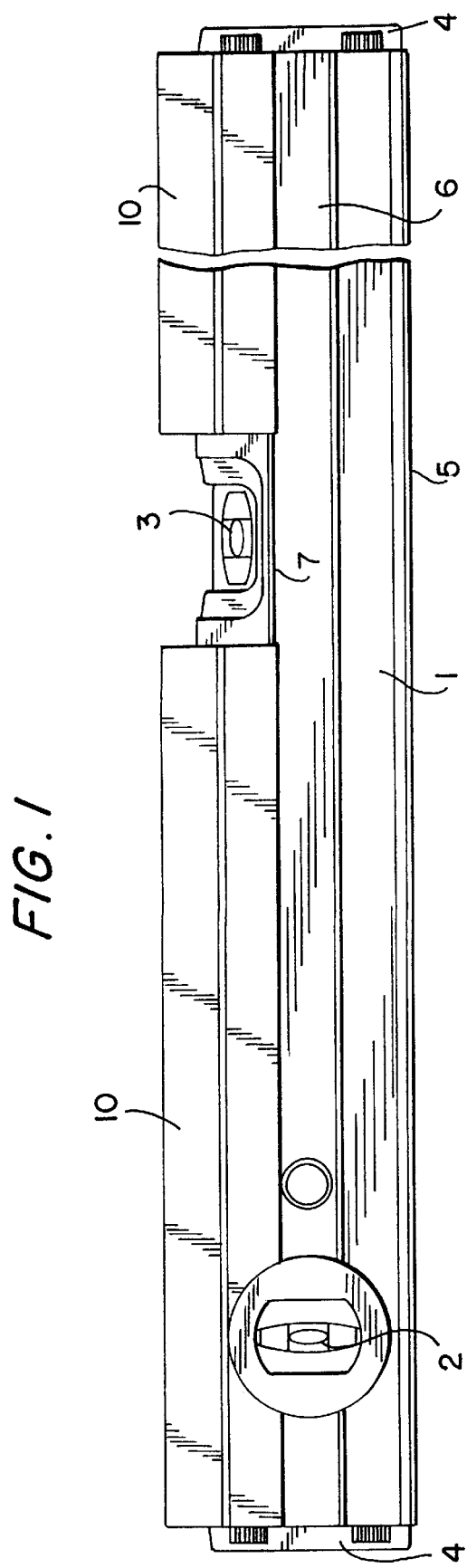
FIG. 1 is a side view of a water level with protective cap according to the present invention.
Figure 2:
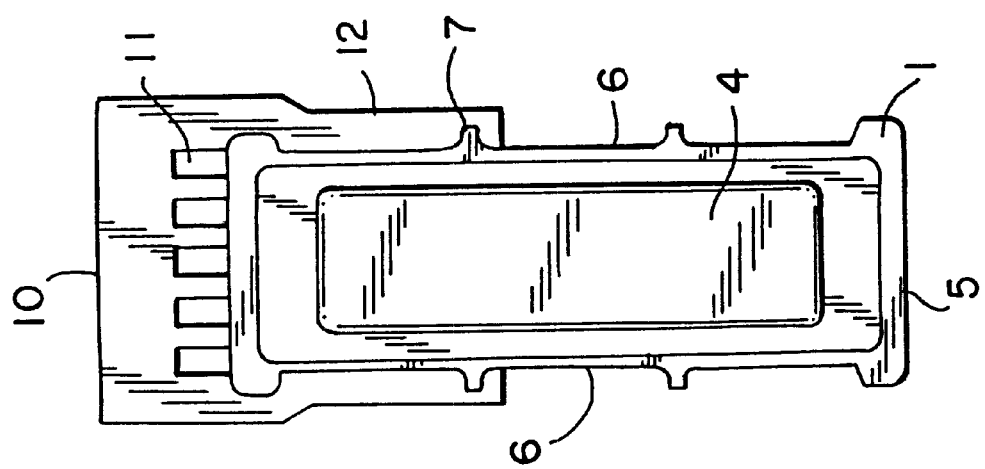
FIG. 2 is a front view of the water level of FIG. 1.

FIGS. 1 and 2 of the drawing show a water level which is essentially composed of a hollow section 1 having a bottom surface 5 for carrying out the measurement and two parallel side walls 6. The ends of the metal section 1 are closed with end caps 4.

A vertical bubble level 2 and a horizontal bubble level 3 make it possible to exactly horizontally or vertically align the bottom surface 5 and the workpieces against which the water level is placed.

A protective cap 10 is placed onto the upper side of the metal section 1. This protective cap 10 has two side walls 12, wherein each side wall has at an inner surface thereof a groove which engages in a key 7 of the metal section 1 provided at the outer side of the metal section 1.

As shown in FIG. 2, the inner side 11 of the protective cap 10 is shaped with profiling in the form of webs in such a way that the concentrated impact energy, for example, of a hammer, is preferably introduced into the parallel side walls 6 of the metal section 1. This prevents indentations of the upper side of the metal section 1.

Figure 3:
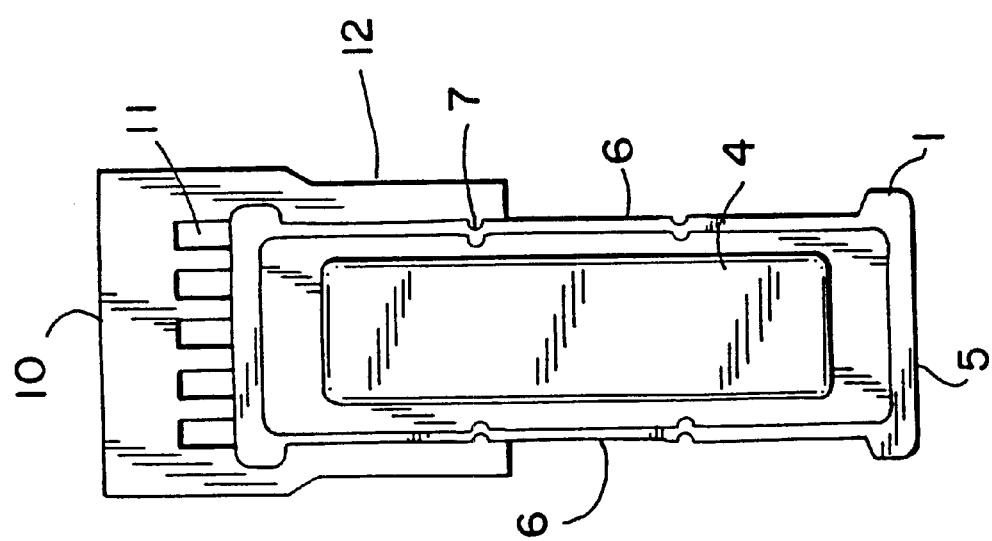
FIG. 3 is a front view of another embodiment of the water level.

FIG. 3 shows another embodiment of the water level according to the present invention in which the metal section 1 is provided with at least one groove and the protective cap 10 is provided with at least one key in engagement with the groove.

Damage of the bottom surface 5 does not have to be expected because this bottom surface usually has contact with the workpiece over a large surface area.

Figure 4:
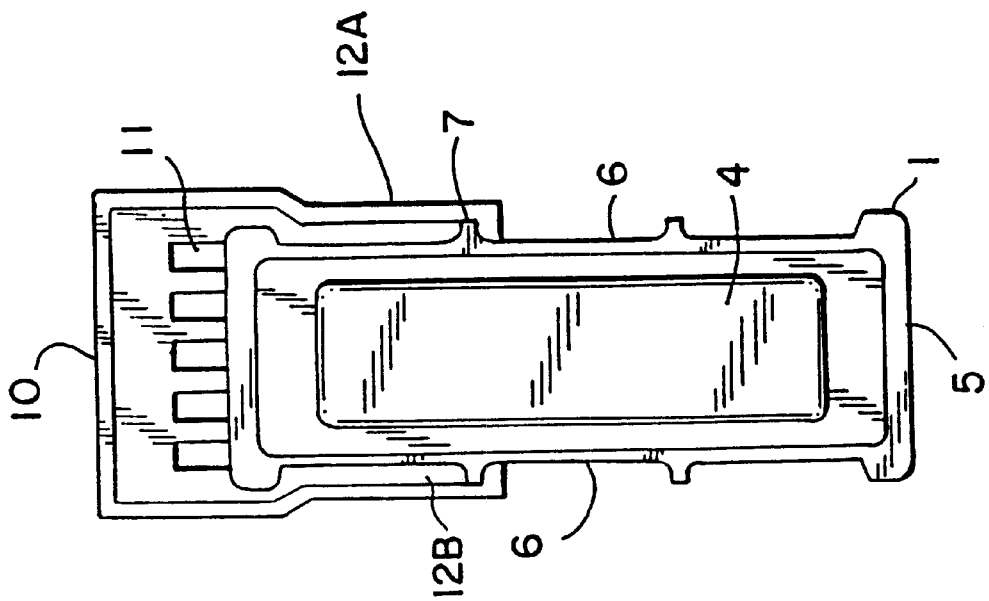
FIG. 4 is a front view of another embodiment of the water level.

Suitable materials for manufacturing the protective cap 10 are basically all impact-proof, elastic materials, especially rubber and comparable synthetic materials, but also wood. An even better adjustment is achieved by using a composite material having an inner layer 12B and an outer layer 12A, as shown in FIG. 4, wherein the inner layer of the composite material is relatively soft and the outer layer is relatively hard.

While specific embodiments of the invention have been shown and described in detail to illustrate the inventive principles, it will be understood that the invention may be embodied otherwise without departing from such principles.

I claim:

1. A water level comprising a light metal section having at least one bottom surface for measuring, side walls and at least one position sensor mounted in the metal section, further comprising a protective cap of an elastic, impact-proof material on an upper side of the metal section, wherein the protective cap is placed on the upper side of the metal section such that a concentrated impact energy introduced to the protective cap is distributed over a large surface area of the metal section.

2. The water level according to claim 1, wherein the at least one position sensor is a bubble level.

3. The water level according to claim 1, wherein the protective cap is in engagement with the side walls of the metal section.

4. The water level according to claim 1, wherein the protective cap is removably mounted on the metal section.

5. The water level according to claim 1, wherein the metal section has at least one key and the protective cap has at least one groove in engagement with the key.

6. The water level according to claim 1, wherein the metal section has at least one groove and the protective cap has at least one key in engagement with the groove.

7. The water level according to claim 1, wherein the protective cap is of rubber.

8. The water level according to claim 1, wherein the protective cap is of synthetic material.

9. The water level according to claim 1, wherein the protective cap is of wood.

10. The water level according to claim 1, wherein the protective cap is of a composite material having inner and outer layers, where in the inner layers are of a relatively soft material and the outer layers are of a relatively hard material.

11. The water level according to claim 1, wherein the protective cap has an inner side facing the upper side of the level, wherein the inner side is provided with profiling.

12. The water level according to claim 11, wherein the profiling is comprised of webs formed on the inner side of the protective cap.

* * * * *